UNITED STATES PATENT OFFICE.

RICHARD KIRCHHOFF, OF BERLIN, GERMANY, ASSIGNOR TO THE ACTIEN-GESELLSCHAFT FÜR ANILIN FABRIKATION, OF SAME PLACE.

BLACK DYE.

SPECIFICATION forming part of Letters Patent No. 536,878, dated April 2, 1895.

Application filed November 10, 1894. Serial No. 528,446. (Specimens.)

*To all whom it may concern:*

Be it known that I, RICHARD KIRCHHOFF, of Berlin, in the Kingdom of Prussia, German Empire, have invented new and useful Improvements in the Production of a Black Dye; and I do hereby declare that the following is a full, clear, and exact description of the invention, which will enable others skilled in the art to which it appertains to make and use the same.

This invention relates to the production of a new tetrazo dye which produces on unmordanted cotton fast black shades. The new coloring matter is produced by reacting with one molecule of tetrazotized para-amidobenzene-azo-amido-para-cresolether upon one molecule of salicylic acid and combining the intermediate product with one molecule of gamma-amidonaphtol-monosulfo acid in alkaline solution.

The aforementioned diamido base may be obtained by combining para-nitro diazobenzene with amido-para-cresolether and reducing the nitro-amido-azo-compound by means of alkaline sulfids. The base derived in this way for instance from para-amidocresol-methylether ($CH_3$:$OCH_3$:$NH_2$=1:4:3) forms in dry state a yellowish brown powder, easily soluble in alcohol or benzene with a yellow color, melting at 115° centigrade. It is soluble in diluted hydrochloric acid with deep-red color. The preparation of the new dye derived from this base may be practically carried out in the following manner. 25.5 kilograms of para-amidobenzene-azo-amido-para-cresol-methylether (obtained by combining para-nitrodiazobenzene with amido-para-cresolether and reducing the nitro-amido-azo-compound by means of alkaline sulfids) or the corresponding quantity of its sulfate or hydrochlorate, are transformed by nitrite in the well known manner into the tetrazo body. The yellow-brown solution thus obtained is added to a solution of sixteen kilograms of the sodium salt of salicylic acid in presence of an excess of soda. After stirring for one-half hour the production of the intermediate product is complete and twenty-six kilograms of the sodium salt of gamma-amidonaphtolmonosulfo acid are added. The solution is agitated for some hours, then gently heated and the coloring matter is precipitated by means of common salt. It dyes unmordanted cotton in gray to black shades fast to acid, alkali and light. The coloring-matter may be diazotized on the fiber and combined with toluylendiamin, naphtol, amidonaphtolether and the like. To wool and silk the dye-stuff does not show a great affinity.

The coloring-matter in a dry state is a brownish-black powder with metallic luster, soluble in cold water, more readily in hot water with dark red-violet color, which on addition of caustic soda lye turns to red-violet, a great excess of the lye producing a dark blue-black precipitate.

The coloring-matter is to a very small extent soluble in alcohol with dark violet-red color. It is insoluble in ether. From the aqueous solution of the coloring-matter the free color-acid is precipitated on addition of mineral acids or acetic acid in the form of dark greenish-blue flakes. Concentrated sulfuric acid dissolves the dye-stuff with dark blue color, which, on diluting with water, turns at first into greenish-blue, but on further diluting, the free color-acid separates in the form of brown-violet flakes.

Having now described my invention, what I claim is—

The hereinbefore described dye derived from one molecule of tetrazotized para-amidobenzene-azo-amido-para-cresolether one molecule of salicylic acid and one molecule of gamma-amidonaphtolmonosulfo acid possessing the constitution formula

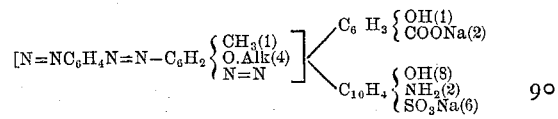

which dye is soluble in cold more readily in hot water with dark violet color, which on addition of caustic soda lye turns to red-violet, soluble in a very small extent in alcohol, insoluble in ether, dissolving in concentrated sulfuric acid with dark blue color, which on diluting with water, turns at first into greenish-blue, but on further diluting, the free color-acid separates in the form of brown-violet flakes said dye producing on unmordanted cotton black shades, and being capable after fixation on the fiber to be rediazotized and combined on the fiber with amins or phenols.

In testimony whereof I hereunto set my hand and affix my seal, in the presence of two witnesses, this 26th day of October, A. D. 1894.

RICHARD KIRCHHOFF. [L. S.]

Witnesses:
 RUDOLF VON ROTZENBURG,
 GUSTAV LUCHT.